Aug. 23, 1927.
W. W. DONEGAN
1,640,146
COMBINATION AUTOMOBILE BUMPER AND TRUNK RACK
Filed Oct. 11, 1926 2 Sheets-Sheet 1
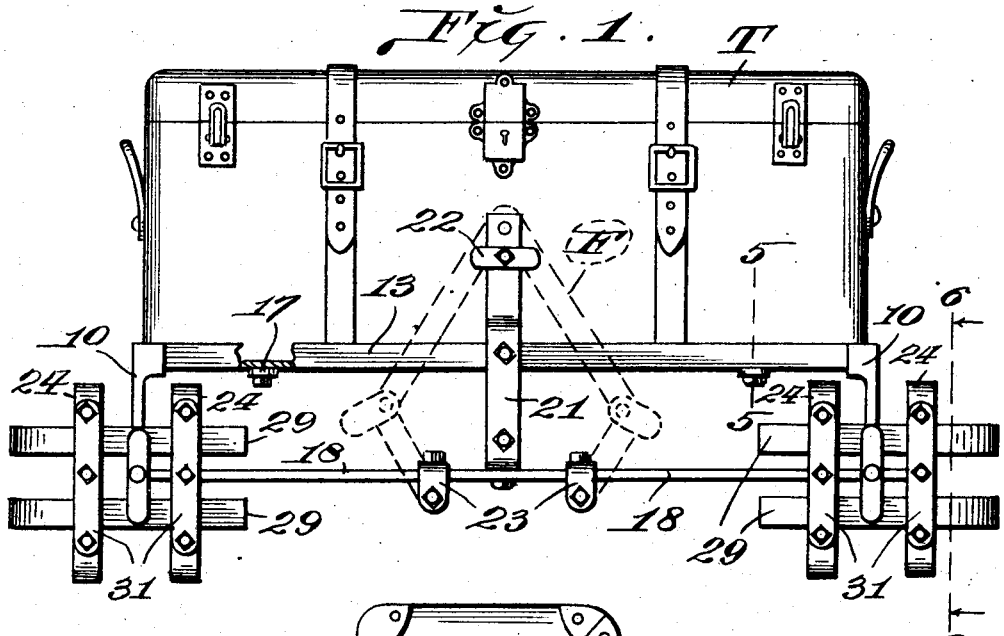
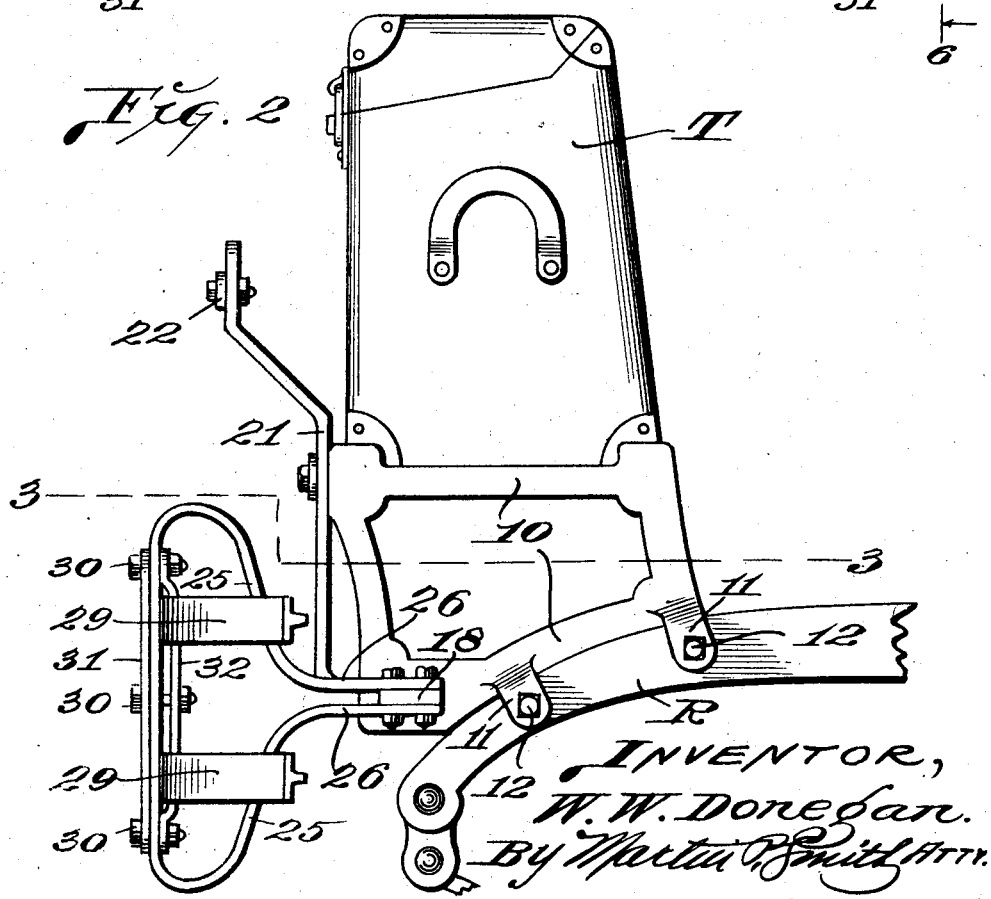
INVENTOR,
W. W. Donegan.

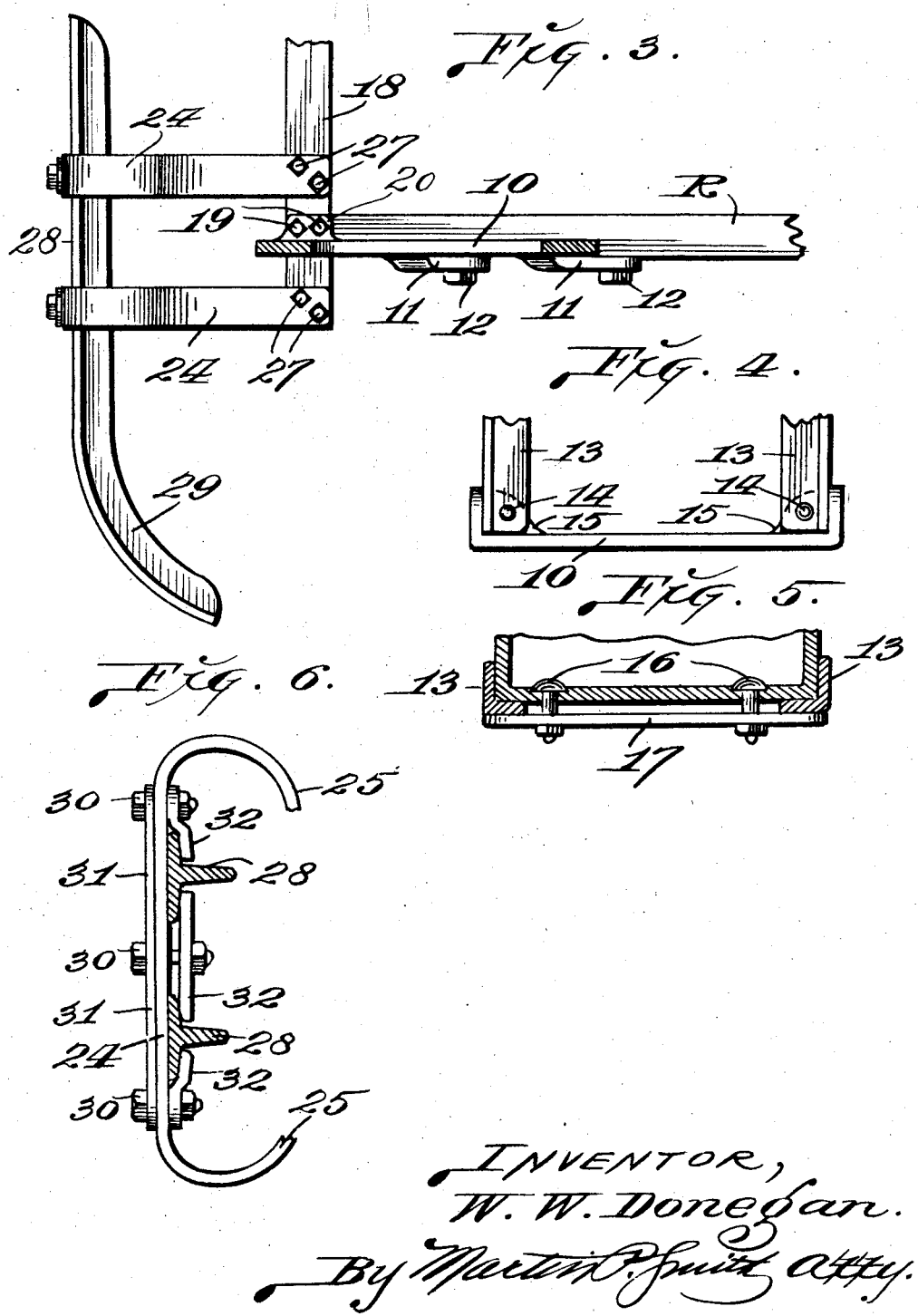

Patented Aug. 23, 1927.

1,640,146

UNITED STATES PATENT OFFICE.

WILLIAM W. DONEGAN, OF LOS ANGELES, CALIFORNIA.

COMBINATION AUTOMOBILE BUMPER AND TRUNK RACK.

Application filed October 11, 1926. Serial No. 140,792.

My invention relates to a combined bumper and trunk rack for automobiles and has for its principal object the provision of a relatively simple, strong and durable structure that may be readily applied to the rear portion of an automobile frame and which structure functions as a rear bumper to absorb shocks resulting from collisions and said structure also serving as a substantial and convenient support for a trunk or like container.

Further objects of my invention are to provide a combined rear bumper and trunk rack that is inexpensive of manufacture, constructed so that the force of all collisions received by the bumper portion of the structure is transmitted directly to the side rail members of the vehicle frame; further, to provide a structure of the character referred to wherein the trunk or like receptacle occupies a position a substantial distance inwardly from the bumper portions of the device; and further, to provide a combined rear bumper and trunk rack which, when properly constructed and finished, presents a neat and pleasing appearance.

With the foregoing and other objects in view, my invention consists in certain novel features of construction and arrangement of parts that will hereinafter be more fully described and claimed and illustrated in the accompanying drawings, in which—

Fig. 1 is a rear elevational view of a combined bumper and trunk rack of my improved construction.

Fig. 2 is an end elevational view of the combined bumper and trunk rack.

Fig. 3 is a horizontal section taken approximately on the line 3—3 of Fig. 2.

Fig. 4 is a plan view of one end of the trunk supporting frame.

Fig. 5 is a cross section taken approximately on the line 5—5 of Fig. 1.

Fig. 6 is an enlarged vertical section taken on the line 6—6 of Fig. 1.

Referring by numerals to the accompanying drawings, 10, 10 designate cast metal skeleton end frames of the trunk supporting frame work, the lower portions of which frames are curved and shaped so as to fit directly upon the curved end portions of the side rails R of an automobile frame or chassis and formed integral with the lower members of said frames 10 are depending lugs 11 that bear directly on the outer faces of rails R. Frames 10 are rigidly secured to rails R by means of bolts 12 that pass through the lugs 11 and the outer vertical flanges of rails R.

Extending between the upper corners of the side frames 10 are front and rear L-shaped rails 13, the horizontally disposed flanges of which project toward each other and the ends of these rails are secured by means of rivets 14 to lugs 15 that project inwardly from the upper corners of the frames 10.

The L-shaped rails 13 and the upper edges of frames 10 constitute a horizontally disposed rectangular frame for the base of a trunk or like container T. In order to firmly secure the trunk to the rack or frame, bolts such as 16 depend from the bottom of the trunk and pass through transversely disposed bars 17, the ends of which are riveted to the L-shaped rails 13 (see Fig. 5).

The end portions of a horizontally disposed rail or bar 18 pass through suitably formed openings in the lower outer corners of frames 10 and said bar is rigidly fixed to the end frames 10 by bolts or rivets 19 that pass through said bar and through lugs 20 that project inwardly from the frames 10 just below the openings for the bar 18 (see Fig. 3).

Secured in any suitable manner to the central portion of bar 18 is the lower end of an upwardly projecting bar 21, the intermediate portion of which is secured to the central portion of the front one of rails 13 and from the latter rail the bar 21 projects outwardly and upwardly as illustrated in Fig. 2. Detachably secured to the upper portion of bar 21 is a bracket 22 that is utilized in securing the upper portion of a substantially inverted V-shaped frame F and which latter serves as a support for a spare tire rim. The lower ends of the supporting member F are detachably connected to brackets 23 that are secured to the intermediate portion of bar 18 (see Fig. 1).

The bumper structure of my invention is formed in two parts, one part being located at each end of rail 18 and said parts are identical in size, form and construction. Each bumper comprises a pair of vertically disposed loops 24, preferably formed of flat steel bars having a certain degree of resiliency. The central portion of each bar is straight and vertically disposed and the end portions are bent rearwardly and thence toward each other so as to form the compound curved portions 25 and the terminal portions of said bars are bent into parallel horizontal planes to form short arms 26 that are positioned on top of and underneath bar 18 and secured thereto by means of bolts or rivets 27.

The members of each pair of these vertically disposed loops 24 are arranged immediately adjacent to and on opposite sides of the corresponding end frame 10 and thus said pairs of loops project rearwardly a substantial distance from the bar 18 and the frames 10, which latter are secured to the automobile frame.

Positioned against the inner faces of the straight vertically disposed portions of the loops 24 are horizontally disposed bumper bars 28, preferably T bars, although flat or channel-shaped bars may be utilized, and the outer portions 29 of these bumper bars are curved inwardly or forwardly toward the body of the vehicle.

The bars 28 are secured to the loops 24 by means of bolts 30 which pass through the loops 24 and through reinforcing plates 31 that are applied to the outer faces of the straight portions of said loops and through clips 32 that are applied to the inner faces of the straight portions of said loops and which clips are in clamping engagement with the flanges of the bumper bars 28 (see Fig. 6).

Inasmuch as the upright loops 24 are formed of metal that has a certain degree of resiliency, said frames will act as vibration and shock absorbers in the event of a collision between the bumper bars and another vehicle or object, and as the bumper frames are located on both sides of the frame of the vehicle they will serve to protect the vehicle and the supported trunk or like container against rear collisions.

That portion of the combined bumper and trunk rack structure between the upright pairs of bumper loops and the bars carried thereby is to a large extent protected by the spare tire and frame F that is supported by bar 21 and the central portion of bar 18.

Thus it will be seen that I have provided a combined bumper and trunk rack for automobiles that is relatively simple in construction, inexpensive of manufacture, and capable of being readily applied to the frame members of practically all makes of cars.

A particular advantage arising from my improved structure is the mounting of the end frames 10 directly upon the end portions of the frame members of the automobile, for by such provision the force of all collisions or impacts received by the bumper structures is transmitted directly to the vehicle frame.

It will be understood that minor changes in the size, form and construction of the various parts of my improved combined bumper and trunk rack may be made and substituted for those herein shown and described without departing from the spirit of my invention, the scope of which is set forth in the appended claims.

I claim as my invention:

1. A combination automobile bumper and trunk rack comprising a pair of side frames adapted to be secured directly to the side members of an automobile frame, a bar connecting the lower portions of said side frames, pairs of vertically disposed loops secured to the ends of said bar and horizontally disposed bumper bars secured to said vertically disposed loops.

2. A combination automobile bumper and trunk rack comprising a pair of side frames adapted to be secured directly to the side members of an automobile frame, a bar connecting the lower portions of said side frames, pairs of vertically disposed loops secured to the ends of said bar, horizontally disposed bumper bars secured to said vertically disposed loops and a pair of trunk supporting rails connecting the upper portions of said side frames.

3. A combination automobile bumper and trunk rack comprising a pair of side frames adapted to be secured directly to the side members of an automobile frame, a bar connecting the lower portions of said side frames, pairs of vertically disposed loops secured to the ends of said bar, horizontally disposed bumper bars secured to said vertically disposed loops, a pair of trunk supporting rails connecting the upper portions of said side frames and means on the central portion of said first-mentioned bar and the outer one of the pair of bars for supporting a spare tire carrying frame.

4. An automobile bumper and trunk rack comprising a pair of side frames adapted to be positioned upon and secured to the end portions of the side members of an automobile frame, a transversely disposed rail connecting the lower outer corners of said side frames, pairs of vertically disposed loops of resilient material secured to the end portions of said rail and projecting outwardly therefrom and pairs of bumper bars detachably secured to the outer vertical portions of said resilient loops.

5. An automobile bumper and trunk rack comprising a pair of side frames adapted to be positioned upon and secured to the end portions of the side members of an automobile frame, a transversely disposed rail connecting the lower outer corners of said side frames, pairs of vertically disposed loops of resilient material secured to the end portions of said rail and projecting outwardly therefrom, pairs of bumper bars detachably secured to the outer vertical portions of said resilient loops and a pair of transversely arranged trunk supporting rails connecting the upper portions of said side frames.

6. In a combination automobile bumper and trunk rack, a horizontally disposed rail, means for securing the same to the side members of an automobile frame and bumpers secured to the ends of said rail, each bumper comprising a pair of vertically disposed loops of resilient material and a horizontally disposed bumper bar secured to said vertically disposed loops.

7. In a combination automobile bumper and trunk rack, a pair of side frames that are adapted to be positioned upon and secured to the side rails of an automobile frame so as to project upwardly from said side rails, a transversely disposed bar connecting the lower portions of said frames, bumpers connected to and projecting outwardly from the end portions of said bar and a pair of trunk supporting rails connecting the upper portions of said side frames.

8. In a combination automobile bumper and trunk rack, a pair of side frames that are adapted to be positioned upon and secured to the side rails of an automobile frame so as to project upwardly from said side rails, a transversely disposed bar connecting the lower portions of said frames, bumpers connected to and projecting outwardly from the end portions of said bar, a pair of trunk supporting rails connecting the upper portions of said side frames and bars connecting said trunk supporting rails intermediate their ends.

9. In a combination automobile bumper and trunk rack, a pair of side frames having their lower portions formed so as to bear directly on top of the end portions of the side members of an automobile frame, portions of which side frames at the lower ends thereof are extended downward so as to overlie the outer faces of the side members of the automobile frame, means for fastening the lower portions of said side frames to the members of the automobile frame upon which they are mounted, a horizontally disposed trunk receiving rack supported by the upper portions of said side frames and bumpers secured to and projecting outwardly from said side frames.

10. The combination with an automobile frame, of a trunk supporting rack detachably secured to the rear portion of said frame and bumpers secured to and projecting outwardly from the end portions of said trunk rack, each of which bumpers comprises a pair of vertically disposed loops of resilient material and horizontally disposed bumper bars secured to said vertically disposed loops.

11. The combination with an automobile frame, of a trunk supporting rack mounted on the rear portion of said automobile frame, which trunk supporting rack comprises a pair of upright side frames, the lower edges of which are curved so as to rest directly on top of the curved ends of the side members of the automobile frame, lugs extending downwardly from the lower portions of said side frames and bearing against the outer faces of the side rails of the automobile frame, fastening means seated in said lugs and the side members of the automobile frame, trunk supporting rails connecting the upper portions of said side frames and bumpers secured to and projecting outwardly from the end portions of the trunk rack.

In testimony whereof I affix my signature.

WILLIAM W. DONEGAN.